United States Patent

[11] 3,608,922

[72] Inventors Erich Best
  Welland;
  Kenneth Booth, Sr., Fonthill, both of Ontario, Canada
[21] Appl. No. 873,820
[22] Filed Nov. 4, 1969
[45] Patented Sept. 28, 1971
[73] Assignee Hyster Company
  Portland, Oreg.

[54] MEANS FOR ACTUATING LOWERING VALVE IN HYDRAULIC HAND-OPERATED PALLET TRUCK
11 Claims, 7 Drawing Figs.
[52] U.S. Cl. .................................... 280/43.12, 60/52 HB
[51] Int. Cl. .................................... B62d 21/18
[50] Field of Search .......................... 280/43.12, 43.23; 60/52 HB

[56] References Cited
UNITED STATES PATENTS
| | | | |
|---|---|---|---|
| 1,852,545 | 4/1932 | Weaver ...................... | 60/52 HB |
| 2,702,988 | 3/1955 | Rhoads et al. ................ | 60/52 HB |

Primary Examiner—Benjamin Hersh
Assistant Examiner—Robert R. Song
Attorney—Chittick, Pfund, Birch, Samuels & Gauthier ABSTRACT: Mechanism whereby the operator of a hand-operated pallet truck can control the release of fluid from the hydraulic lifting cylinder without removing his hands from the truck handle and while both of his feet are on the ground. The mechanism comprises hand-operated means located at the end of the handle for applying a controlled opening movement to the lowering valve regardless of the position of the truck handle.

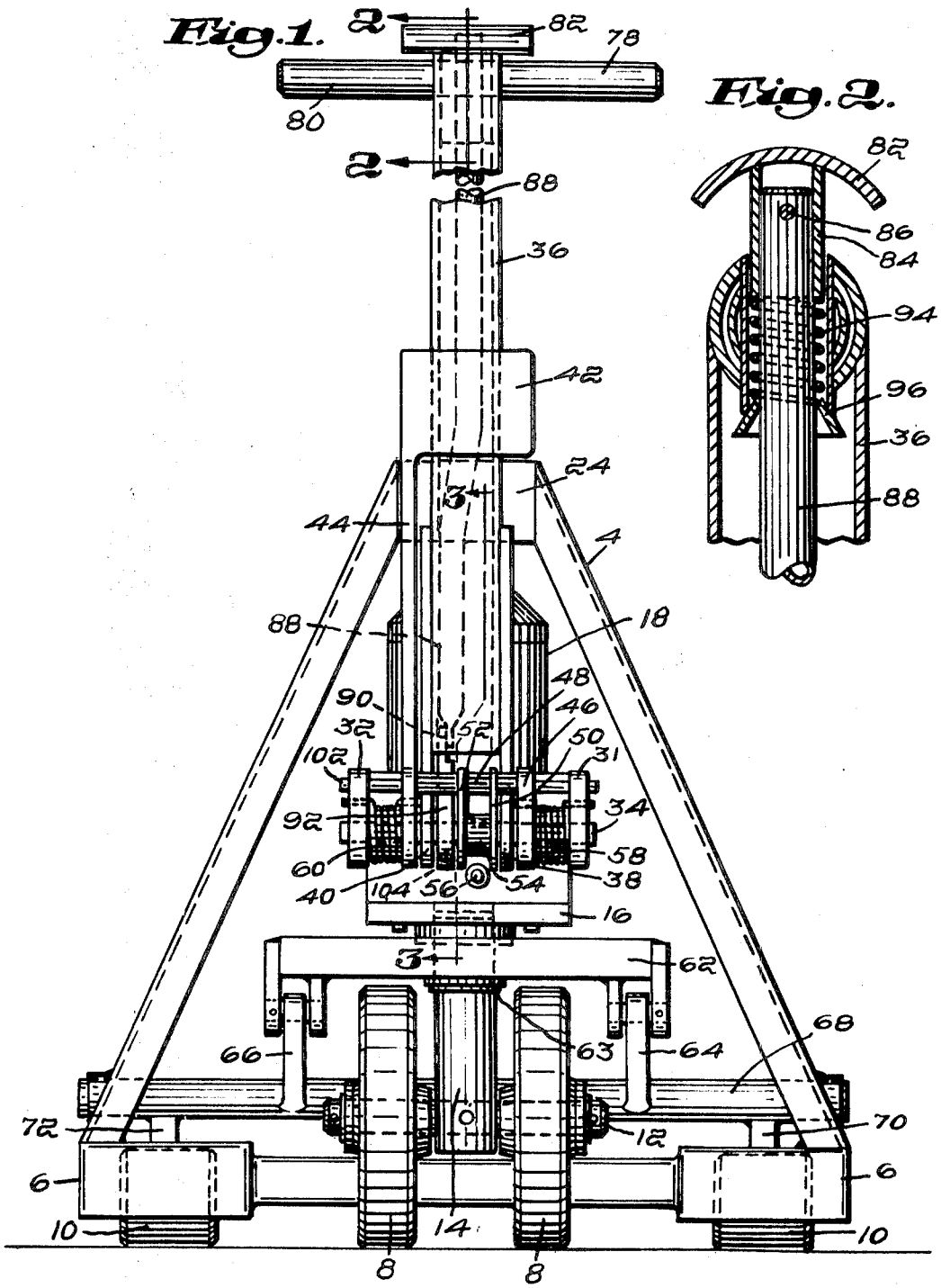
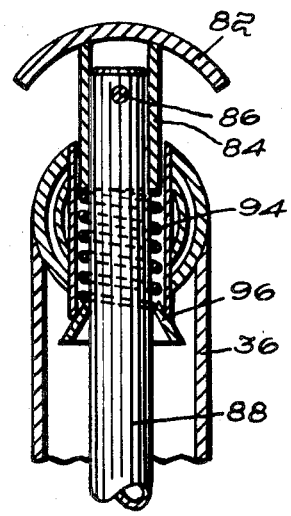

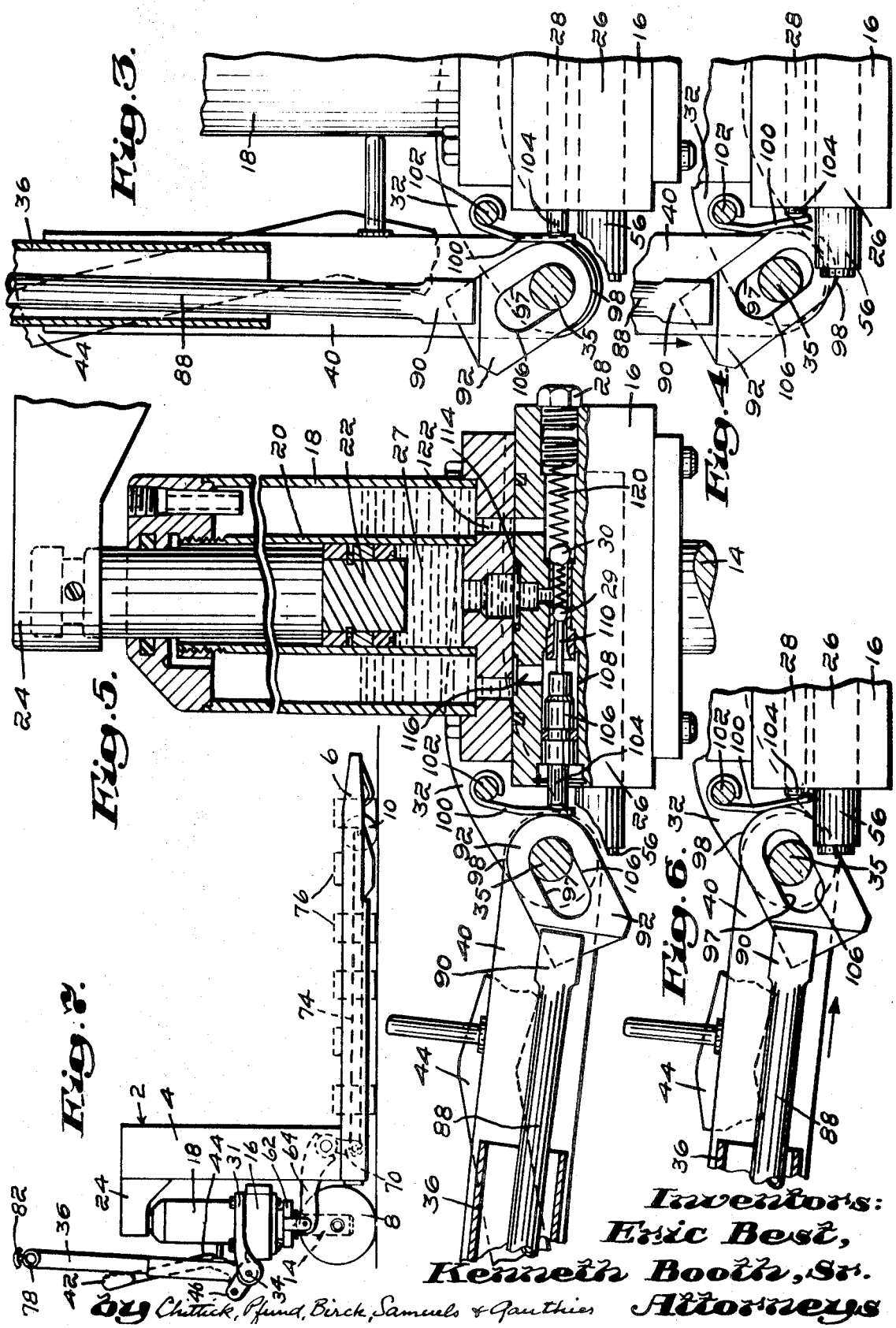

3,608,922

MEANS FOR ACTUATING LOWERING VALVE IN HYDRAULIC HAND-OPERATED PALLET TRUCK

BRIEF SUMMARY OF THE INVENTION

Hand-operated pallet trucks are well known in the material-handling field. Briefly, such trucks ordinarily comprise a four-wheeled unit in which the dual front wheel is the steering wheel and the smaller rear wheels support forks which may be placed under a conventional load-carrying pallet. With the forks under the pallet, the operator then raises the forks by manually operated mechanical or hydraulic means to lift the pallet off the floor. By manes of a handle connected to the front steering wheel, the operator pulls or pushes the truck to the pallet's destination where the forks are lowered to deposit the pallet at the desired place.

In the present invention, the fork and pallet lifting means is hydraulically operated. The mechanism comprises a cylinder and piston, and a foot-driven pump to force liquid into the cylinder driving the piston upwardly to raise the forward end of the truck frame. Related linkages cause the ends of the forks to be raised correspondingly and simultaneously above the smaller rear wheels. Valves operate automatically to hold the liquid in the cylinder as the truck is being moved with the pallet in raised position.

When the truck reaches its destination, the liquid in the cylinder is released by opening a lowering valve to allow escape of the cylinder liquid and corresponding descent of the piston, forks and pallet. Heretofore, the valve-opening means has been located adjacent the cylinder base and, to be operated, required the operator to stop the truck and lift one foot off the floor to operate the lowering valve.

The invention herein permits the operator to effect operation of the lowering valve while the truck is in motion and both his feet are on the floor. This may be done regardless of the position of the handle and regardless of the speed at which the truck may be traveling in forward or backward direction.

Thus, for example, the operator can start to lower the pallet while he is still propelling the truck and approaching the pallet's destination. The lowering can be stopped instantly by release of the hand-controlled element to prevent premature engagement of the pallet with the floor. Alternatively, the operator may delay release of the valve until the truck has come to rest at the pallet location. The valve control element may then be actuated with the handle in any position between the generally horizontal pulling or pushing and the customary vertical inoperative position.

In summary, the invention permits the operator to control exactly the time, place, and extent of the lowering of the truck forks and pallet while the truck is in motion or stationary and both of his feet are on the floor.

BRIEF DESCRIPTION OF THE DRAWINGS

FIG. 1 is a front elevation of a hand-operated pallet truck incorporating the invention. The handle is shown in vertical position.

FIG. 2 is a vertical section taken on the line 2—2 of FIG. 1 showing the hand-actuated control element which when moved actuates the lowering valve.

FIG. 3 is an enlarged fragmentary side elevation of the lowering-valve-actuating mechanism in OFF position.

FIG. 4 is a view similar to FIG. 3 showing the lowering-valve-actuating mechanism in actuated position.

FIG. 5 is a vertical section of the cylinder and piston with the lowering-valve-actuating mechanism in OFF position and the truck handle generally in horizontal position.

FIG. 6 is similar to FIG. 5 showing the lowering-valve-actuating mechanism in actuated position.

FIG. 7 is a side elevation of the truck shown in FIG. 1 drawn to greatly reduced scale for orientation purposes.

DESCRIPTION OF A PREFERRED EMBODIMENT

Referring first to FIG. 7, there is shown a hand-operated pallet truck indicated at 2 of a type with which the invention may be used. This truck comprises a vertical frame 4 at the forward end and rearwardly extending forks 6. The truck is supported by dual front wheels 8 and rear wheels 10. As can best be seen in FIG. 1, the dual front wheels 8 are mounted on an axle 12 carried by a steering column 14 which is rigidly and nonrotatably affixed to a cylinder base 16. The base carries a cylinder fluid reservoir 18 (see FIG. 5) within which is an operating cylinder 20 containing a piston 22. The upper end of piston 22 is in swiveled connection with an extension 24 of frame 4. Within base 16 is a foot-actuated pump 26 by which fluid 27 may be forced from reservoir 18 into cylinder 20 to drive piston 22 upwardly. The base 16 also contains a valve mechanism generally referred to at 28 which mechanism includes a lowering valve 29 and a safety valve 30. Lowering valve 29, when opened, permits fluid to flow out of cylinder 20 under the pressure of piston 22 and back into reservoir 18. In other words, when lowering valve 29 is open, the weight of the truck 2 acting on piston 22 will cause continuous descent of the frame 4 and related forks 6.

On both sides of base 16 are mounted forwardly extending arms 31 and 32. Between them extends a horizontal preferably continuous shaft 34 on which the truck handle 36 is mounted for vertical swinging movement by means of appropriately drilled handle sideplates 38 and 40. This arrangement permits handle 36 to swing from the vertical position shown in FIGS. 1, 3, 4 and 7 downwardly to the more or less horizontal position shown in FIGS. 5 and 6. The middle portion of shaft 34 which is aligned with handle 36 is indicated in FIGS. 3, 4, 5 and 6 at 35 and will be referred to as a guiding element.

A foot treadle 42 (see FIGS. 1 and 7) having an operating arm 44 is also mounted on shaft 34. A short arm 46 also pivoted on shaft 34 is rigidly connected to arm 44 by an integral transverse shaft 48. This shaft 48 carries in rigid relation thereto a pair of short arms 50 and 52 between which is mounted a roller 54. When foot treadle 42 is moved downwardly, roller 54 engages the plunger 56 of pump 26. When treadle 42 after engagement with plunger 56 is moved down and up, plunger 56 and pump 26 are repeatedly actuated forcing liquid from reservoir 18 into cylinder 20 to drive piston 22 upwardly. The details of the pumping means which are conventional and do not form any part of the present invention are not shown.

A pair of torsion springs 58 and 60 have their ends in engagement with the fixed arms 31 and 32 and the treadle are 44 and handle sideplate 40 to urge the treadle and the handle upward to vertical positions as shown in FIGS. 1 and 7. The springs 58 and 60 are of sufficient strength to maintain both handle 36 and treadle 42 in vertical position when the truck is unattended.

From the foregoing explanation, it will now be understood that the handle 36 may be swung through an arc about shaft 34 from vertical to generally horizontal position. Likewise, the handle 36 being connected through shaft 34 to base 16 and steering column 14 may be moved from one side to the other to turn the wheels 8 to steer the truck. Turning of the wheels 8 also causes rotation of cylinder 20 about its vertical axis.

Although it is no part of the invention, since the mechanism is well understood, it should be explained that when the piston 22 is moved upwardly through operation of treadle 42 thereby to raise frame 4, simultaneously a linkage is operated which causes the forks 6 to move correspondingly upwardly with respect to wheels 10. This linkage consists of a crossmember 62 held in place by snap ring 63 on the rotatable steering post 14. At each end of member 62 are links 64 and 66 having their rear ends connected to a rotatable shaft 68 carried at its ends in the lower part of frame 4. This shaft has downwardly extending arms 70 and 72 which are connected to longitudinally extending bars under the forks 6, one of which is shown in dotted lines at 74 in FIG. 7. Thus, as the frame 4 is raised by upward movement of piston 22, the shaft 68 is rotated counterclockwise as viewed in FIG. 7 and the arms 70 and 72 force compression members 74 to the rear. These, acting through suitable linkages, swing the fork ends upwardly away from wheels 10. The extent of upward movement of the forks is the same as the upward movement of piston 22 and hence the forks 6 maintain their horizontal position as they are raised to engage a pallet 76 indicated in dotted lines in FIG. 7. With the truck frame raised and the pallet off the floor, the operator may then swing handle 36 to a downward position to push or pull and steer the truck to its destination.

With the truck at its destination, or as it is approaching the same, the operator, by the means about to be described, may actuate lowering valve 29 allowing the liquid in cylinder 20 to flow back to reservoir 18 and thus to lower the forks 6 and thereby to place the pallet 76 on the floor. The valve-releasing mechanism about to be described enables the operator to open valve 29 to a controlled degree without stopping the truck and regardless of the angular position of handle 36.

The release mechanism on handle 36 comprises a hand-engageable plate 82 or equivalent of such width as to be easily reached by either of the operator's thumbs while his fingers are still on grips 78 and 80. Plate 82 is mounted on a short tubular member 84 (see FIG. 2) which in turn is fastened by pin 86 to a long preferably tubular rod 88 which extends downwardly through handle 36. To the lower end of rod 88 is affixed as at 90 a wedge 92 of novel configuration as can be seen from an inspection of FIGS. 3, 4, 5 and 6. Rod 88 and wedge 92 are normally maintained in retracted or up position with respect to handle 36 by means of a helical compression spring 94 (see FIG. 2). This spring surrounds the upper portion of rod 88 and has its lower end against a fixed stop 96 connected to handle 36 while its upper end presses upwardly against the tubular member 84.

Wedge 92 in a preferred form is a metal plate having an elongated oval aperture therethrough within which is guiding element 35. This oval aperture has its long axis preferably at an angle to the axis of handle 36. This angle determines the rate of transverse movement of wedge 92. The oval aperture provides a first surface 97 adapted to engage and slide along the intermediate guiding element part 35 of shaft 34 which part at the position of engagement with surface 97 is preferably semicylindrical and has its axis coinciding with the axis of shaft 34. The surface 97 over the length of its movable engagement with the guiding element 35 (which in the construction disclosed herein is an integral part of shaft 34) is preferably straight but alternatively by having surface 97 curved somewhat convexly or concavely, the rate of transverse movement of wedge 92 with respect to the axis of handle 36 could be varied, if thought desirable, in relation to the movement of plate 82.

The lower exterior surface of wedge 92 as shown in FIGS. 3, 4, 5 and 6 is more or less concentric with the surface of element 35 as indicated at 98 and this exterior surface engages one side of a shim in the form of finger 100 which is pivotally mounted on a transverse shaft 102 carried by the sidearms 30 and 32.

The other side of finger 100 rests against the outer end of a plunger 104, which plunger when moved inwardly of base 16 by actuation of wedge 92 causes the lowering valve 29 to open to a greater or less degree according to the movement of plate 92.

A further alternative could have the opening in wedge 92 more or less vertical and with that portion of wedge 92 between element 35 and plunger 104 tapered, thus to produce the same effect on plunger 104 when rod 88 is moved downwardly toward element 35.

Referring again to FIGS. 3, 4 and 5, it can be seen in FIG. 3 that when rod 88 is in its normal uppermost position, the curved surface 98 of wedge 92 will be in engagement with finger 100 which in turn will rest against plunger 104 in its fully extended position at which valve 29 is closed. If the operator then presses down on plate 82, wedge 92 will move downwardly and to the right sliding somewhat on finger 100 as shown in FIG. 4, and causing finger 100 and valve plunger 104 to move to the right thereby to open lowering valve 29. The extent of the opening of lowering valve 29 is controlled by the extent of downward movement of plate 82 and rod 88 under the control of the operator. Thus, when the truck is at rest with the handle 36 in vertical position, and the pallet is off the floor resting on the raised forks 6, the operator may lower the pallet in the manner just described.

If FIG. 3 is now compared with FIG. 5, in which handle 36 has been swung from vertical to a more or less horizontal position, such movement has not caused any change in position of finger 100 or plunger 104 because of the circular end surface 98 on wedge 92. In other words, so long as surface 97 of wedge 92 remains unmoved with respect to the guiding element 35 (the intermediate part of shaft 34), no movement of plunger 104 will occur when handle 36 is swung from the vertical downwardly to the full limit of the handle's arcuate motion.

If we now compare FIG. 5 with FIG. 6, it will be seen that movement of rod 88 toward guiding element 35 has caused the curved circular wedge surface 98 to move diagonally upwardly to the right to slide along and move finger 100 against plunger 104 thereby to effect the same result that was achieved in FIG. 4 when the handle 36 was in vertical position.

It should also be mentioned that finger 100 could be omitted provided the end of plunger 104 was large enough in vertical dimension to be engaged by the outer surface 98 of wedge 92 regardless of the position of handle 36. The finger 100 merely provides a convenient force-transmitting means.

The lower side 106 of the aperture in wedge 92 forms a third surface parallel to surface 97. Surface 106 acts as a substitute for surface 97 when the force applied as in FIG. 6, for example, might otherwise cause surface 97 to tend to separate from the guiding element 35.

From the foregoing explanation, it will be appreciated that regardless of the angular position of handle 36, any movement of finger plate 82 toward guiding element 35 will cause corresponding movement of plunger 104. The lowering valve per se may take any desired form so long as it is capable of being actuated by in-and-out movement of a controlling member such as that illustrated by plunger 104.

The lowering valve shown consists of a fluidtight piston 106 movable within cylinder 108. An extension 110 will force lowering valve 29 from its seat when plunger 104 is moved to the right. Fluid from cylinder 20 may then flow through passage 114 and back into reservoir 18 by way of cylinder 108 and passage 116. A safety valve 30 is also provided. If fluid pressure in cylinder 20 should become excessive due to overloading of the truck, spring 120 will be overcome so that fluid can flow from cylinder 20 through passage 114 past valve 30 and thence through passage 122 to reservoir 18.

Modifications and further applications of the invention will now be apparent to those skilled in the art without departing from the spirit of the invention.

We claim:

1. In a hand-operated pallet truck, a hydraulic cylinder rotatable about about a substantially vertical axis with respect to said truck, a lowering valve associated with said cylinder, means for actuating said valve, said means comprising a handle pivoted on a shaft fixed means and thereby to respect to said cylinder, a wedge having an elongated opening therethrough through which shaft passes and an exterior surface positioned adjacent said valve-actuating means, means extending along said handle permitting manually induced movement of said wedge with respect to said handle and shaft, the configuration of said wedge opening and the said wedge exterior surface being such that whenever said wedge is moved toward said shaft regardless of handle position, the part of said wedge exterior surface that is positioned to engage said valve-actuating means will also move in a direction at right angles to engage said valve-actuating means and thereby to open said lowering valve.

2. In a hand-powered pallet truck having a hydraulic cylinder and piston for raising the truck frame, said cylinder rotatable about a substantially vertical axis with respect to said truck, means for manually actuating a cylinder lowering valve fixed in relation to said cylinder and having a movable control member, said means comprising a handle mounted on a pivot permitting movement of said handle in a vertical plane only with respect to said cylinder, a wedge-guiding element aligned with said handle pivot and located adjacent said movable control member, a wedge with first and second surfaces engaging said wedge-guiding element and said movable control member, respectively, means maintaining said wedge in a substantially constant angular relation to the axis of said handle, the said first surface of said wedge coacting with said wedge-guiding element whereby when said wedge is moved in a direction away from the free end of said handle, the said second surface of said wedge will move in a direction at right angles to and away from said element against said movable control member to open said lowering valve, the second surface of said wedge at its lower part being substantially concentric with said wedge-guiding element whereby when said handle is rotated on its pivot in said vertical plane without movement of said wedge with respect to said handle, the position of said movable control member will remain substantially unchanged.

3. The construction set forth in claim 2, the said first surface of said wedge being disposed at an angle to said handle axis.

4. The construction set forth in claim 2, and a shim interposed between the said second surface of said wedge and said movable control member.

5. The construction set forth in claim 2 in which said wedge has a continuous body surrounding said wedge-guiding element.

6. The construction set forth in claim 2, said truck including a manually operated pump means for forcing liquid into said cylinder to move said piston to raise said truck frame, and said lowering valve permitting lowering of said truck frame under the control of the operator.

7. The construction as set forth in claim 2, said wedge having a third surface parallel to said first wedge for cooperation with said wedge-guiding element surface when the position of the handle is such that the first wedge surface could otherwise separate from said wedge-guiding element under the applied forces.

8. In a hydraulic-type hand-operated pallet truck having a steering wheel, a handle for moving and guiding said truck, said handle swingable in a vertical plane on a shaft fixed in relation to said wheel, a hydraulic cylinder fixed in relation to said shaft, a lowering valve associated with said cylinder, a lowering-valve-actuating member extending in the vicinity of said shaft, means for manually moving said lowering-valve-actuating member, said means comprising a wedge associated with said handle, said wedge having curved inner and outer surfaces more or less concentric about the axis of said shaft, said curved inner surface engageable with said shaft, said curved outer surface engageable with said actuating member, said curved surfaces providing means whereby vertical swinging movement of said handle will not cause movement of said actuating member, said wedge having a generally straight surface extending away from said curved inner surface for engaging said shaft and running diagonally of the axis of said handle, and means for moving said wedge extending the length of said handle for actuation by the truck operator.

9. In a hand-powered truck having a cylinder and hydraulically actuated piston therein for raising and lowering the truck frame, a valve for relieving hydraulic pressure in said cylinder and means for manually actuating said valve, said means comprising a handle pivotally mounted on a horizontal shaft fixed with respect to said cylinder, said handle swingable on said shaft in a vertical plane, a rod associated with said handle and extending from a position adjacent the end of said handle to a position near said shaft, a wedge on the lower end of said rod, said shaft passing through an enlarged opening in said wedge, said wedge opening having a straight interior surface at an angle to said handle axis and engaging said shaft and a semicircular interior surface extending from said straight surface and partially surrounding the said shaft, that portion of the wedge radially of the interior semicircular configuration being of substantially uniform width with a semicircular exterior surface, a valve-actuating element in fixed position with respect to said shaft and adjacent the said semicircular exterior surface whereby said handle may be swung from vertical to horizontal without causing any movement of the adjacent valve-actuating member and whereby movement of said rod toward said shaft regardless of the handle position will cause said wedge to move diagonally with respect to the handle axis and against said valve-actuating means.

10. The construction set forth in claim 8 and a member between said wedge and valve-actuating means for receiving pressure of said wedge thereagainst and transmitting the pressure to said valve-actuating means.

11. In a hydraulic hand-powered truck having a handle and including a hydraulic cylinder rotatable about a vertical axis with respect to said truck for use in raising and lowering the truck frame, a lowering valve which when open allows escape of compressed fluid from said cylinder to permit lowering of said truck frame, means for actuating said lowering valve regardless of the position of the said handle, said means comprising a shaft fixed with respect to said cylinder and on which said handle is pivoted for swinging movement in a vertical plane, a rod extending along said handle, means adjacent the end of said handle to facilitate manual movement of said rod toward said shaft, a wedge on the lower end of said rod, said wedge having an opening therethrough with an interior surface engaging said shaft and an exterior surface positioned adjacent said valve-actuating means, said handle and wedge being rotatable about said shaft without changing the wedge position with respect to said handle, and, when said wedge is moved by said rod toward said shaft, said exterior surface adjacent said lowering-valve-actuating means will move away from said shaft at right angles thereto to engage and move said lowering-valve-actuating means.

UNITED STATES PATENT OFFICE
CERTIFICATE OF CORRECTION

Patent No. 3,608,922  Dated September 28, 1971

Inventor(s) Eric Best et al.

It is certified that error appears in the above-identified patent and that said Letters Patent are hereby corrected as shown below:

On the cover sheet [72] "Erich" should read -- Eric --.
Column 1, line 12, "manes" should read --means --; Column 2, line 45, "are" should read -- arm --. Column 4, line 56, cancel "about", second occurrence; line 58, "means and thereby to" should read -- with --; line 69, cancel "also"; line 70, before "to engage" insert -- to the shaft axis --.

Signed and sealed this 23rd day of May 1972.

(SEAL)
Attest:

EDWARD M. FLETCHER, JR.
Attesting Officer

ROBERT GOTTSCHALK
Commissioner of Patents